US00RE47800E

(19) United States
(12) Reissued Patent
Kubota et al.

(10) Patent Number: US RE47,800 E
(45) **Date of Reissued Patent: *Jan. 7, 2020**

(54) IMAGING LENS

(71) Applicant: KANTATSU CO., LTD., Tochigi (JP)

(72) Inventors: Yoji Kubota, Nagano (JP); Ichiro Kurihara, Tochigi (JP)

(73) Assignee: KANTATSU CO., LTD., Tokyo (JP)

( * ) Notice: This patent is subject to a terminal disclaimer.

(21) Appl. No.: 16/044,480

(22) Filed: Jul. 24, 2018

Related U.S. Patent Documents

Reissue of:
(64) Patent No.: 8,842,377
Issued: Sep. 23, 2014
Appl. No.: 13/168,238
Filed: Jun. 24, 2011

U.S. Applications:
(63) Continuation of application No. PCT/JP2010/068441, filed on Oct. 20, 2010, and a continuation of application No. 15/260,650, filed on Sep. 9, 2016, now Pat. No. Re. 47,014, which is an application for the reissue of Pat. No. 8,842,377, and a continuation of application No. 14/754,746, filed on
(Continued)

(30) Foreign Application Priority Data

Oct. 30, 2009 (JP) ..... 2009-249649

(51) Int. Cl.
*G02B 9/60* (2006.01)
*G02B 13/04* (2006.01)
*G02B 13/00* (2006.01)

(52) U.S. Cl.
CPC ..... *G02B 13/0045* (2013.01)

(58) Field of Classification Search
CPC ..... G02B 13/0045; G02B 9/60; G02B 13/18
USPC ..... 359/763, 764
See application file for complete search history.

(56) References Cited

U.S. PATENT DOCUMENTS 4,900,141 A 2/1990 Ohshita
5,386,321 A 1/1995 Kawamura
(Continued)

FOREIGN PATENT DOCUMENTS

JP 07-104180 A 4/1995
JP 07-120671 A 5/1995
(Continued)

OTHER PUBLICATIONS

Hobbs, P. C. D. "Chapter 4: Lenses, Prisms, and Mirror," in Building Electro-Optical Systems: Making it all Work, Second Edition, John Wiley & Sons, Inc., Hoboken, NJ, USA, 2009, pp. 145-179.

(Continued)

*Primary Examiner* — Christina Y. Leung
(74) *Attorney, Agent, or Firm* — Kubotera & Associates, LLC

(57) ABSTRACT

An imaging lens includes, in this order from an object side, an aperture stop ST, a positive first lens L1, a negative second lens L2 having a meniscus shape that directs a convex surface on the object side near an optical axis, a positive third lens L3, a positive fourth lens L4 having a meniscus shape that directs a concave surface on the object side near an optical axis, and a negative fifth lens L5 having a meniscus shape that directs a convex surface on the object side near an optical axis.

12 Claims, 12 Drawing Sheets

Related U.S. Application Data

Jun. 30, 2015, now Pat. No. Re. 46,352, which is a continuation of application No. PCT/JP2010/068441.

(56) References Cited

U.S. PATENT DOCUMENTS

| | | | | |
|---|---|---|---|---|
| 7,502,181 | B2 | 3/2009 | Shinohara | |
| 7,826,151 | B2 | 11/2010 | Tsai | |
| 7,965,454 | B2 | 6/2011 | Tanaka et al. | G02B 13/0045 359/557 |
| 8,000,030 | B2 | 8/2011 | Tang | |
| 8,179,613 | B2 * | 5/2012 | Sano | G02B 13/18 359/708 |
| RE46,352 | E * | 3/2017 | Kubota | G02B 13/0045 |
| RE47,014 | E * | 8/2018 | Kubota | G02B 13/0045 |
| 2009/0122423 | A1 | 5/2009 | Park | |
| 2009/0268312 | A1 | 10/2009 | Onoda | |
| 2010/0053776 | A1 | 3/2010 | Tanaka et al. | |
| 2011/0134305 | A1 | 6/2011 | Sano et al. | |
| 2011/0188131 | A1 * | 8/2011 | Sano | 359/714 |
| 2013/0335622 | A1 * | 12/2013 | Kwon | 348/360 |

FOREIGN PATENT DOCUMENTS

| | | | |
|---|---|---|---|
| JP | 2007-264180 | A | 10/2007 |
| JP | 2010-079296 | A | 4/2010 |
| JP | 2010-197665 | A | 9/2010 |
| JP | 2010-224521 | A | 10/2010 |

OTHER PUBLICATIONS

"Effective Focal Length." Collins Dictionary of Astronomy. Eds. John Daintith and William Gould. London: Collins, 2006.

Hecht Eugene, "Optics, Fourth Edition," Addison Wesley, San Francisco, CA U.S.A., 2002, p. 243-246.

Notice of Reasons for Rejection for JP Patent Application 2009-249649, Oct. 9, 2012, Japan Patent Office.

* cited by examiner

IMAGING LENS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*The present application is a continuation reissue application of the application Ser. No. 15/260,650 filed on Sep. 9, 2016, issued as U.S. Pat. No. RE47,014, which is a continuation reissue application of the application Ser. No. 14/754,746 filed on Jun. 30, 2015, issued as U.S. Pat. No. RE46,352, which is an application for reissue of U.S. Pat. No. 8,842,377 issued on Sep. 23, 2014. The present application has a co-pending continuation reissue application Ser. No. 16/044,488.*

CROSS-REFERENCE TO RELATED APPLICATIONS

This is a continuation application of the prior PCT application PCT/JP2010/068441, filed on Oct. 20, 2010, pending, which claims priority from a Japanese patent application No. 2009-249649, filed on Oct. 30, 2009, the entire content of which is incorporated herein by reference.

BACKGROUND OF THE INVENTION AND RELATED ART STATEMENT

The present invention relates to an imaging lens for forming an image on an imaging element such as a CCD sensor and a CMOS sensor. In particular, the present invention relates to an imaging lens suitable for mounting in a relatively small camera such as a cellular phone, a digital still camera, a portable information terminal, a security camera, an onboard camera, and a network camera.

An imaging lens to be mounted in a small camera has been required to have a high resolution lens configuration suitable for a recently developed imaging element with a high resolution, as well as to use a fewer number of lenses. Conventionally, a three-lens imaging lens has been frequently used as such an imaging lens. However, as an imaging element has higher resolution, it is more difficult to obtain sufficient performances only with three lenses. In these years, another lens configuration, a four-lens configuration or a five-lens configuration, has been applied.

Among the configurations, since a configuration with five lenses has a higher design flexibility, it may be expected to apply such lens configuration in a next-generation imaging lens. An imaging lens disclosed in Patent Reference has been known as an imaging lens having such five-lens configuration.

The imaging lens disclosed in Patent Reference includes a positive first lens having a convex surface on the object side; a second lens having a negative meniscus shape that directs a concave surface on the image side; a third lens having a positive meniscus shape that directs a convex surface on the image side; a negative fourth lens in which both surfaces have aspheric shape and a surface on the image side near an optical axis thereof is concave; and a positive or negative fifth lens, in which both surfaces are aspheric shape, in this order from the object side.

In this configuration, when a lower limit of Abbe's number of the first lens and upper limits of Abbe's numbers of the second and the fourth lens are respectively assigned, an axial chromatic aberration and chromatic aberration of magnification are corrected, so as to compatible with a high performance imaging lens.

Patent Reference Japanese Patent Application Publication No. 2007-264180

According to the imaging lens of the aforementioned Patent Reference, it is possible to obtain relatively satisfactory aberrations. Since the total length of the lens system is long, however, it is difficult to attain both miniaturization of an imaging lens and satisfactory aberration correction.

In view of the problems of the conventional techniques described above, an object of the present invention is to provide an imaging lens with a small size capable of properly correcting aberration.

SUMMARY OF THE INVENTION

In order to attain the objects described above, according to the invention, an imaging lens includes a first lens having positive refractive power; a second lens having negative refractive power; a third lens having positive refractive power; a fourth lens having positive refractive power; and a fifth lens having negative refractive power arranged in this order from the object side to the image side. The second lens is formed in a shape so that both a curvature radius of a surface thereof on the object side and a curvature radius of a surface thereof on the image side are positive and the fourth lens is formed in a shape so that both a curvature radius of a surface thereof on the object side and a curvature radius of a surface thereof on the image side are negative.

According to the imaging lens of the invention, among the five lenses arranged in an order according to the refractive powers, i.e. positive, negative, positive, positive, and negative refractive powers, the second lens is shaped to form a negative meniscus lens that directs a convex surface on the object side near an optical axis thereof and the fourth lens is shaped to form a positive meniscus lens that directs a concave surface on the object side near the optical axis thereof. For this reason, according to the imaging lens of the invention, the second lens and the fourth lens are disposed having their concave surfaces face each other across the positive third lens. Therefore, according to the configuration of the imaging lens like this, it is possible to attain miniaturization of an imaging lens while satisfactorily correcting aberrations.

According to the imaging lens of the aforementioned configuration, the fifth lens is preferably formed in a shape so that both a curvature radius of a surface thereof on the object side and a curvature radius of a surface thereof on the image side are positive.

When the whole lens system has a focal length f and a composite focal length of the third lens and the fourth lens is f34, the imaging lens of the aforementioned configuration preferably satisfies the following conditional expression (1):

$$0.5<f34/f<5.0 \quad (1)$$

When the conditional expression (1) is satisfied, it is possible to restrain the field curvature and the astigmatism within satisfactory range while specifically restraining an incident angle of an off-axis light beam into an imaging element among light beams that are emitted from the imaging lens within certain range. As well known, there is so-called maximum incident angle, which is a limit in an incident angle of a light beam for an imaging element to receive due to its structure. In case a light beam outside the maximum incident angle range enters the imaging element, a resultant image has a dark periphery because of a shading phenomenon. Accordingly, it is necessary to restrain the incident angle of the light beam emitted from the imaging lens to the imaging element within a certain range.

On the other hand, the second lens having negative refractive power is disposed on the object side of the third lens, and the fifth lens similarly having negative refractive power is disposed on the image side of the fourth lens. More specifically, the third and the fourth lenses having positive refractive power are disposed between the second and the fifth lenses that have negative refractive power. When the conditional expression (1) is satisfied, it is also possible to satisfactorily correct the field curvature and the astigmatism in the aforementioned refractive power arrangement.

When the value exceeds the upper limit "5.0" in the conditional expression (1), the composite refractive power of the third and the fourths lenses decreases in comparison with refractive power of the whole lens system and the image surface tilts in the plus direction (on the image side), so that it becomes difficult to restrain the field curvature within preferred range. In addition, since the astigmatic difference increases, it is also difficult to obtain a flat image surface. On the other hand, when the value is below the lower limit "0.5", the composite refractive power of the third and the fourth lenses increases in comparison with the refractive power of the whole lens system, and the image surface tilts in the minus direction (on the object side). Therefore, even in this case, it is difficult to restrain the field curvature and the astigmatism within preferred range. In addition, it is also difficult to restrain an incident angle of an off-axis light beam to an imaging element within certain range.

When the first lens has a focal length f and the second lens has a focal length f2, it is preferred to satisfy the following conditional expression (2):

$$0.4<|f1/f2|<1.0 \quad (2)$$

When the conditional expression (2) is satisfied, it is possible to restrain the spherical aberration and the field curvature in a balanced manner within satisfactory range, while restraining the axial chromatic aberration and the off-axis chromatic aberration of magnification within satisfactory range. When the value exceeds the upper limit "1.0", since the refractive power of the second lens increases in comparison with the refractive power of the first lens, the axial chromatic aberration and the off-axis chromatic aberration of magnification is excessively corrected (that of short wavelength is in the plus direction in relative to that of a reference wavelength). Furthermore, since the spherical aberration and the field curvature increase in the plus direction (on the image side), it is difficult to obtain satisfactory imaging performance. On the other hand, when the value is below the lower limit "0.4", since the refractive power of the second lens decreases in comparison with the refractive power of the first lens, the axial chromatic aberration and the off-axis chromatic aberration of magnification are insufficiently corrected (that of a short wavelength is in the minus direction in relative to that of a reference wavelength). In addition, in this case, the spherical aberration and the field curvature increase in the minus direction (on the object side), so that it is still difficult to obtain satisfactory imaging performance.

When a composite focal length of the first lens and the second lens is f12 and a composite focal length of the third lens and the fourth lens is f34, it is preferred to satisfy the conditional expression (3):

$$0.2<f34/f12<4.0 \quad (3)$$

When the conditional expression (3) is satisfied, it is possible to attain miniaturization of the imaging lens and restrain an incident angle of the off-axis light beam emitted from the imaging lens to the imaging element within certain range, while restraining the aberrations in a balance manner within the preferred range. When the value exceeds the upper limit "4.0", composite refractive power of the first lens and the second lens increases in comparison with composite refractive power of the third lens and the fourth lens, and it is advantageous to attain miniaturization of the imaging lens. At the same time, however, it is difficult to restrain the incident angles of the off-axis light beams emitted from the imaging lens to the imaging element within certain range. Moreover, since the inward coma aberration by an off-axis light beam is generated, it is difficult to obtain satisfactory imaging performance. On the other hand, when the value is below the lower limit "0.2", composite refractive power of the first lens and the second lens decreases in comparison with composite refractive power of the third lens and the fourth lens, and it is advantageous to restrain the incident angles within certain range, but it is difficult to attain miniaturization of the imagine lens.

When Abbe's number of the first lens is νd1, Abbe's number of the second lens is νd2, Abbe's number of the third lens is νd3, Abbe's number of the fourth lens is νd4, and Abbe's number of the fifth lens is νd5, it is preferred to satisfy the following conditional expressions (4) to (8):

$$50<\nu d1<85 \quad (4)$$

$$\nu d2<30 \quad (5)$$

$$50<\nu d3<85 \quad (6)$$

$$50<\nu d4<85 \quad (7)$$

$$50<\nu d5<85 \quad (8)$$

When the conditional expressions (4) to (8) are satisfied, it is possible to more satisfactorily correct the axial chromatic aberration and the off-axis chromatic aberration of magnification. As a method of correcting those chromatic aberrations, it has been known to combine a highly-dispersed material and a low-dispersed material. In case of an imaging lens of a five-lens configuration, it is possible to correct chromatic aberration by using the method to alternately combine a highly-dispersed material and a low-dispersed material. However, in case of correcting chromatic aberrations by the method, a chromatic aberration of magnification frequently turns to an excessively corrected state from an insufficiently corrected state as it is close to a periphery from a center of the image surface, when the length (thickness) of the imaging lens along the optical axis thereof decreases, especially in case of off-axis light beams. Therefore, it is difficult to satisfactorily correct chromatic aberration of magnification. According to the imaging lens of the invention, since Abbe's numbers of four out of the five lenses are greater than 50 when the conditional expressions (4) to (8) are satisfied, the axial chromatic aberration and the off-axis chromatic aberration of magnification are more satisfactorily corrected.

According to the imaging lens of the invention, it is possible to both reduce a size of the imaging lens and correct the aberration properly, thereby making it possible to provide the imaging lens with the small size capable of correcting aberrations properly.

DETAILED DESCRIPTION OF PREFERRED EMBODIMENTS

Hereunder, referring to the accompanying drawings, an embodiment of the present invention will be fully described.

FIGS. 1, 4, and 7, and 10 are schematic sectional views showing image lenses in Numerical Data Examples 1 to 4 according to the embodiment, respectively. Since a basic lens configuration is the same among the Numerical Data Examples 1 to 4, the lens configuration of the embodiments will be described with reference to the lens sectional view of Numerical Data Example 1.

Figure 1:
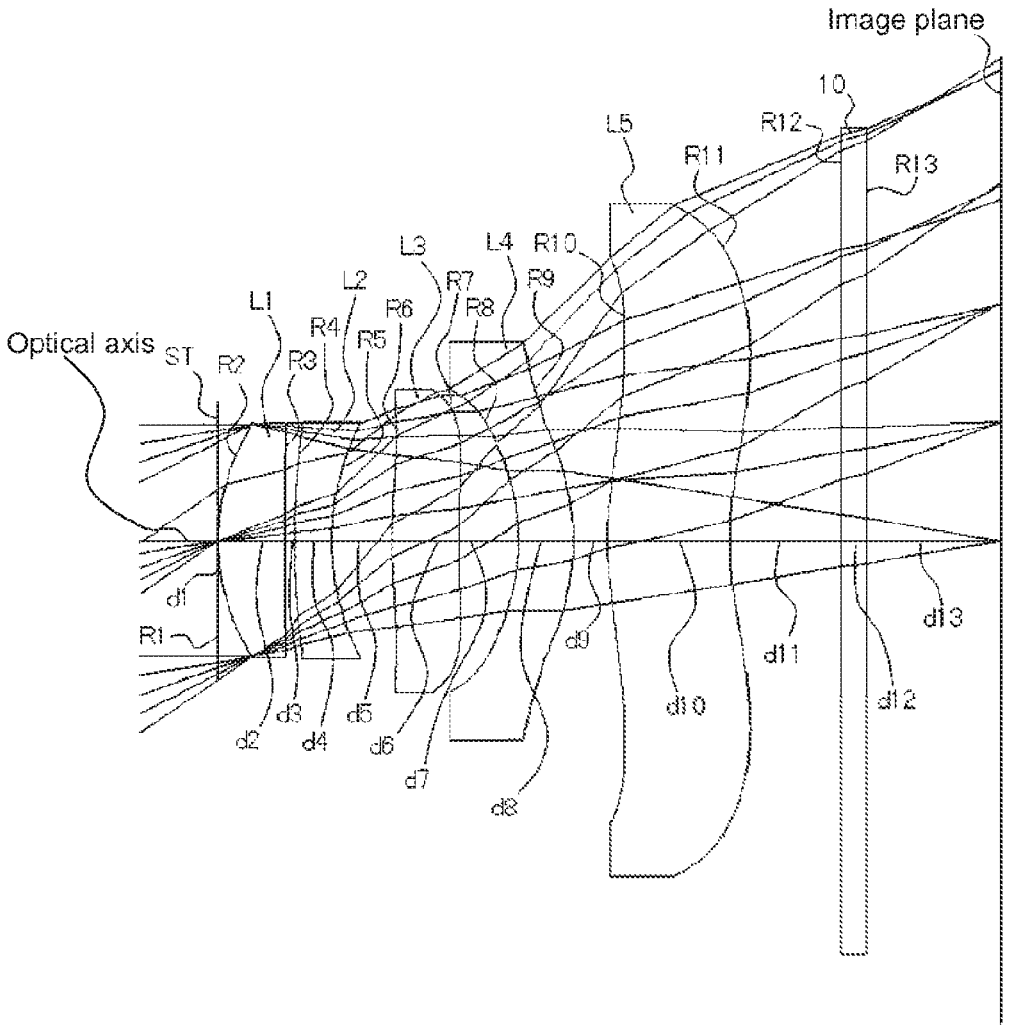
FIG. 1 is a schematic sectional view showing a configuration of an imaging lens in Numerical Data Example 1.

As shown in FIG. 1, the imaging lens of the embodiment includes an aperture stop ST; a first lens L1 having positive refractive power; a second lens L2 having negative refractive power: a third lens L3 having positive refractive power; a fourth lens L4 having positive refractive power; and a fifth lens L5 having negative refractive power arranged in this order from an object side to an image side of the imaging lens. A cover glass 10 is provided between the fifth lens L5 and the image plane of an imaging element. It is noted that the cover glass 10 may be optionally omitted. In addition, according this embodiment, an aperture stop ST is provided closer to the object side than the tangential plane containing the vertex of a surface of the first lens L1 on the object side. The position of the aperture stop ST is not limited to the position in this embodiment, and for example, it may be between the tangential plane containing the vertex of a surface of the first lens L1 on the object side and a surface of the first lens L1 on the image side.

In an imaging lens of the aforementioned configuration, the first lens L1 is formed in a shape so that a curvature radius of a surface on the object side R2 is positive and a curvature radius of a surface on the image side R3 is negative, i.e., a shape to be biconvex lens near the optical axis thereof. Here, the shape of the first lens L1 is not limited to such shape having a biconvex lens near the optical axis thereof, and may be any as long as the curvature radius of a surface on the object side R2 is positive, so that various shapes may be employed. Numerical Data Examples 1 and 3 are examples that the shape of the first lens L1 is a biconvex lens near the optical axis thereof, whereas Numerical Data Examples 2 and 4 are examples that the first lens L1 is formed in a shape so that both curvature radii R2 and R3 are positive, i.e. the shape to be a meniscus lens that directs a convex surface on the object side near the optical axis thereof.

The second lens L2 is formed in a shape so that both a curvature radius of a surface thereof on the object side R4 and a curvature radius of a surface on the image side R5 are positive and is shaped to form a meniscus lens that directs a convex surface on the object side near the optical axis thereof. The third lens L3 is formed in a shape so that both a curvature radius of a surface thereof on the object side R6 and a curvature radius of a surface on the image side R7 are positive and is shaped to forma meniscus lens that directs a convex surface on the object side near the optical axis thereof. The shape of the third lens L3 is not limited to a shape of a meniscus lens that directs a convex surface on the object side near the optical axis thereof. Other than the ones described above, the third lens L3 may have a shape of a biconvex lens near the optical axis thereof, or a shape having negative curvature radii R6 and R7, i.e. a shape to be a meniscus lens that directs a concave surface on the object side.

The fourth lens L4 is formed in a shape so that both a curvature radius of a surface thereof on the object side R8 and a curvature radius of a surface thereof on the image side R9 are negative, i.e. a shape to be a meniscus lens that directs a concave surface on the objects side near the optical axis thereof. The fifth lens L5 is formed in a shape so that both a curvature radius of a surface thereof on the object side R10 and a curvature radius of a surface on the image surface R11 are positive, and is shaped to form a meniscus lens that directs a convex surface on the object side near the optical axis thereof. Here, the shape of the fifth lens is not limited to the shape of a meniscus lens that directs a convex surface on the object side near the optical axis thereof, and may be shaped to form a meniscus lens that directs a concave surface on the object side near the optical axis thereof, or formed in a shape so that a curvature radius R10 is negative and a curvature radius R11 is positive, i.e. a shape to be a biconcave lens near the optical axis thereof.

In addition, a surface of the fifth lens L5 on the image side has an aspheric shape that is convex on the object side near the optical axis thereof and concave on the object side at the periphery. Because of the shape of the fifth lens like this, an incident angle of a light beam emitted from an imaging lens to an image plane is restrained. The imaging lens of this embodiment satisfies the following conditional expressions (1) to (3):

$$0.5<f34/f<5.0 \quad (1)$$

$$0.4<|f1/f2|<0.9 \quad (2)$$

$$0.2<f34/f12<4.0 \quad (3)$$

In the above conditional expressions, f: Focal length of the whole lens system f1: Focal length of the first lens L1 f2: Focal length of the second lens L2 f34: Composite focal length of the third lens L3 and the fourth lens L4

In addition, the imaging lens of this embodiment satisfies the following conditional expressions (4) to (8) in addition to the above-described conditional expressions (1) to (3), in order to satisfactorily correct chromatic aberrations:

$$50<\nu d1<85 \quad (4)$$

$$\nu d2<30 \quad (5)$$

$$50<\nu d3<85 \quad (6)$$

$$50<\nu d4<85 \quad (7)$$

$$50<\nu d5<85 \quad (8)$$

In the Above expressions, vd1: Abbe's number of the first lens L1 at a d line vd2: Abbe's number of the second lens L2 at a d line vd3: Abbe's number of the third lens L3 at a d line vd4: Abbe's number of the fourth lens L4 at a d line vd5: Abbe's number of the fifth lens L5 at a d line Here, it is not necessary to satisfy all of the conditional expressions (1) to (8). When any single one of the conditional expressions (1) to (8) is individually satisfied, it is possible to obtain an effect corresponding to the respective conditional expression.

In the embodiment, the lens surfaces of all lenses are shaped to form an aspheric surface as necessary. When the aspheric surface applied to the lens surfaces have an axis Z in the optical axis direction, a height H in a direction perpendicular to the optical axis thereof, a conical coefficient k, and aspheric coefficients $A_4$, $A_6$, $A_8$, $A_{10}$, $A_{12}$, and $A_{16}$, the aspheric surfaces of the lens surfaces may be expressed as follows:

[Formula 1]

$$Z = \frac{\frac{H^2}{R}}{1+\sqrt{1-(k+1)\frac{H^2}{R^2}}} + A_4H^4 + A_6H^6 + A_8H^8 + A_{10}H^{10} + A_{12}H^{12} + A_{14}H^{14} + A_{16}H^{16}$$

Next, Numerical Data Examples of the embodiment will be described. In each of Numerical Data Examples, f represents a focal length of a whole lens system, Fno represents an F number, and ω represents a half angle of view, respectively. In addition, i represents a surface number counted from the object side, R represents a curvature radius, d represents a distance between lens surfaces (an on-axis surface spacing) on the optical axis, Nd represents a refractive index at a d line, and vd represents Abbe's number at the d line. Here, the aspheric surfaces are indicated with surface numbers affixed with * (asterisk). For reference, sum of surface spacing from a surface of the first lens L1 on the object side to a surface of the fifth lens L5 on the image side is indicated as L15.

Numerical Data Example 1

Basic lens data are shown below.
f = 5.690 mm, Fno = 3.000, ω = 34.18°
Unit: mm

Surface Data

| Surface Number i | R | d | Nd | vd |
|---|---|---|---|---|
| (Object) | ∞ | ∞ | | |
| 1 (Stop) | ∞ | 0.00000 | | |
| 2* | 1.7839 | 0.53697 | 1.53460 | 56.3 (=vd1) |
| 3* | −36.8497 | 0.08287 | | |
| 4* | 8.1562 | 0.30000 | 1.61420 | 26.0 (=vd2) |
| 5 | 2.0240 | 0.49004 | | |
| 6* | 4.7722 | 0.54460 | 1.53460 | 56.3 (=vd3) |
| 7* | 6.5369 | 0.48711 | | |
| 8* | −1.6692 | 0.44978 | 1.53460 | 56.3 (=vd4) |
| 9* | −1.7486 | 0.27430 | | |
| 10* | 3.1053 | 0.99632 | 1.53460 | 56.3 (=vd5) |
| 11* | 2.6949 | 0.90000 | | |
| 12 | ∞ | 0.21000 | 1.51633 | 64.12 |
| 13 | ∞ | 1.09751 | | |
| (image plane) | ∞ | | | |

f1 = 3.198
f2 = −4.466
f3 = 29.857
f4 = 70.689
f5 = −247.269
f12 = 7.370
f34 = 22.808
L15 = 4.16199

Aspheric Surface Data

Second Surface k = 0.00000000, $A_4$ = −0.76414807E−02, $A_6$ = 0.34244562E−01,
$A_8$ = −0.35162391E−01, $A_{10}$ = 0.72884223E−02,
$A_{12}$ = 0.16282392E−01, $A_{14}$ = −0.13286570E−01

Third Surface k = 0.00000000, $A_4$ = 0.79211780E−01, $A_6$ = −0.43839669E−01,
$A_8$ = −0.76746172E−02, $A_{10}$ = −0.11892911E−01,
$A_{12}$ = −0.10264347E−01, $A_{14}$ = 0.13571981E−01

Fourth Surface k = 0.00000000, $A_4$ = 0.68255774E−01, $A_6$ = −0.55078565E−01,
$A_8$ = −0.84020557E−02, $A_{10}$ = −0.13405905E−01,
$A_{12}$ = −0.33193102E−02, $A_{14}$ = 0.14026150E−01

Sixth Surface k = 0.00000000, $A_4$ = −0.68806298E−01, $A_6$ = 0.55162308E−02,
$A_8$ = 0.95610071E−02, $A_{10}$ = −0.77026230E−02,
$A_{12}$ = −0.11260551E−01, $A_{14}$ = 0.51394464E−02

Seventh Surface k = 0.00000000, $A_4$ = −0.83816907E−01, $A_6$ = 0.64066471E−02,
$A_8$ = −0.78499370E−02, $A_{10}$ = −0.19790795E−01,
$A_{12}$ = 0.40753526E−02, $A_{14}$ = 0.18631791E−03

Eighth Surface k = 0.00000000, $A_4$ = 0.11254679, $A_6$ = −0.13203205,
$A_8$ = 0.14635128, $A_{10}$ = −0.90218095E−01,
$A_{12}$ = 0.27510752E−02, $A_{14}$ = 0.62647402E−02

Ninth Surface k = −0.91589860, $A_4$ = 0.35033555E−01, $A_6$ = 0.47692822E−02,
$A_8$ = 0.10837748E−01, $A_{10}$ = −0.53011858E−02,
$A_{12}$ = 0.35563263E−03, $A_{14}$ = 0.70837290E−04

Tenth Surface k = 0.00000000, $A_4$ = −0.91591404E−01, $A_6$ = 0.31997817E−01,
$A_8$ = −0.80405225E−02, $A_{10}$ = 0.81598968E−03, -continued Basic lens data are shown below.
f = 5.690 mm, Fno = 3.000, ω = 34.18°
Unit: mm $A_{12}$ = 0.12913470E−03, $A_{14}$ = −0.42574901E−04,
$A_{16}$ = 0.30352929E−05
Eleventh Surface k = −7.26384200, $A_4$ = −0.46752322E−01, $A_6$ = 0.13616036E−01,
$A_8$ = −0.34575303E−02, $A_{10}$ = 0.57070286E−03,
$A_{12}$ = −0.60882678E−04, $A_{14}$ = 0.42759142E−05,
$A_{16}$ = −0.17802666E−06

The values of the conditional expressions (1) to (8) are shown below.

f34/f = 4.008
|f1/f2| = 0.716
f34/f12 = 3.095
νd1 = 56.3
νd2 = 26.0
νd3 = 56.3
νd4 = 56.3
νd5 = 56.3

Accordingly, the imaging lens of Numerical Data Example 1 satisfies the conditional expressions (1) to (8).

Figure 2:
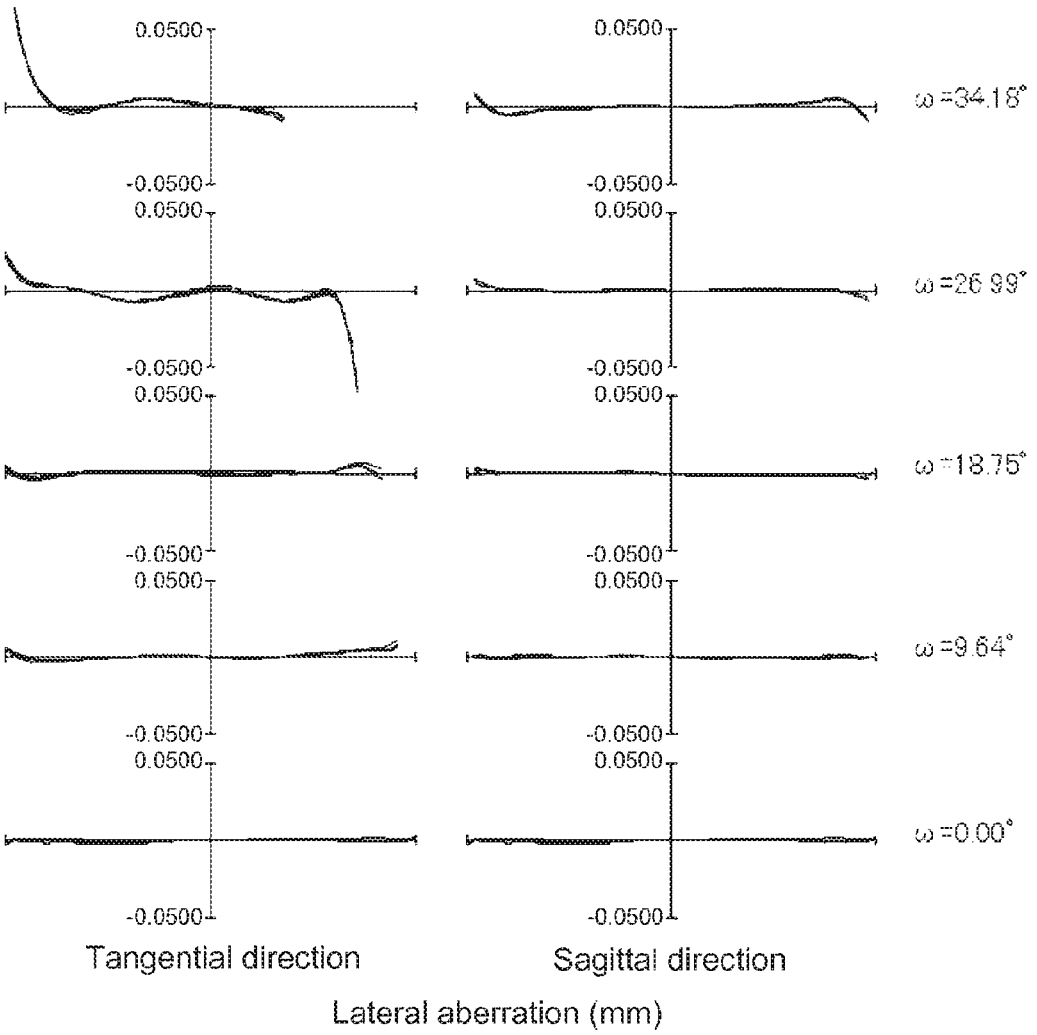
FIG. 2 is an aberration diagram showing a lateral aberration of the imaging lens in Numerical Data Example 1.
Figure 3:
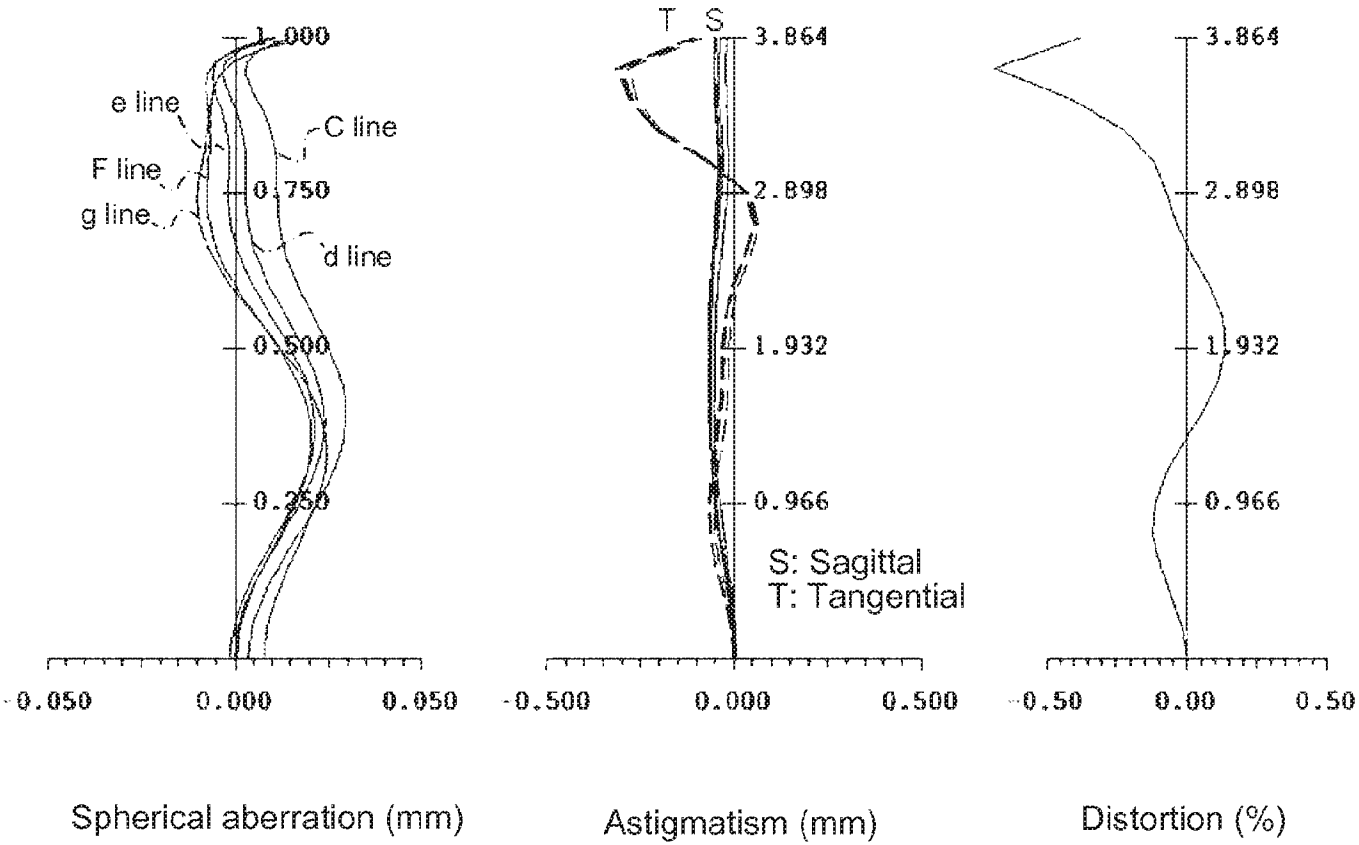
FIG. 3 is an aberration diagram showing a spherical aberration, an astigmatism, and a distortion of the imaging lens in Numerical Data Example 1.
Figure 4:
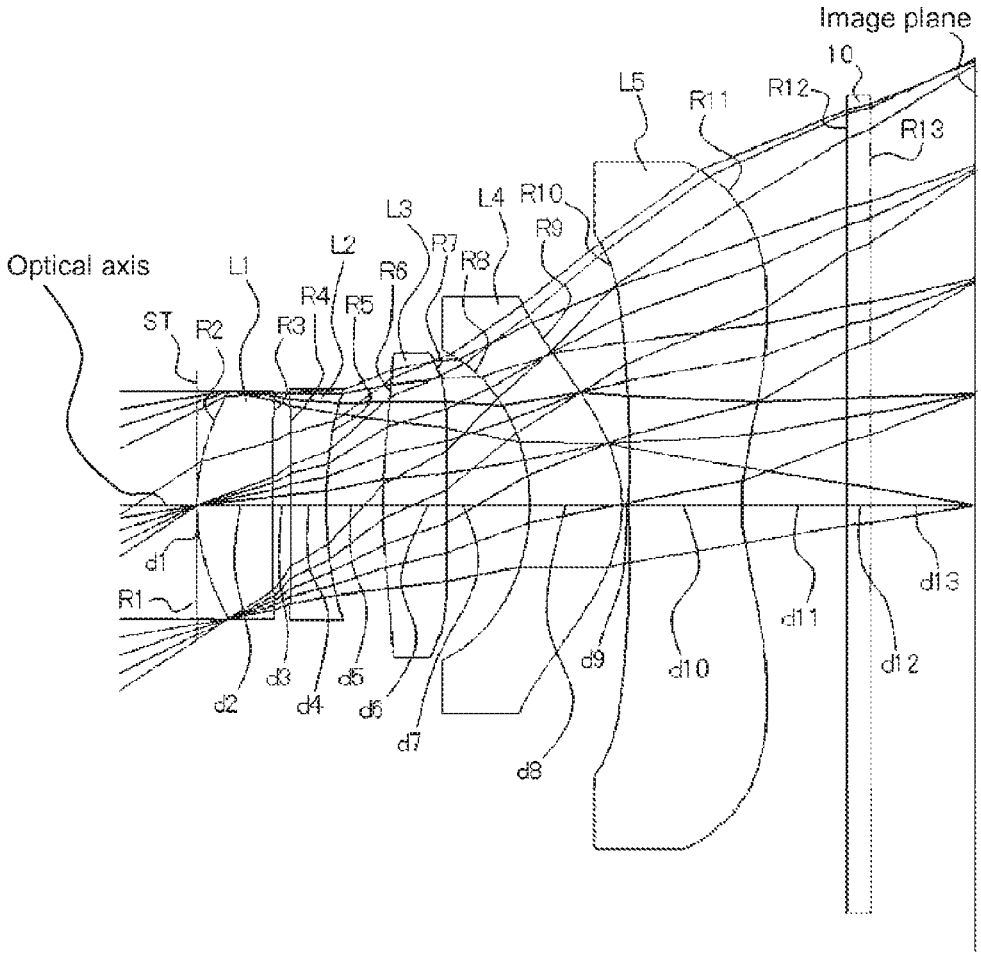
FIG. 4 is a schematic sectional view showing a configuration of an imaging lens in Numerical Data Example 2.
Figure 5:
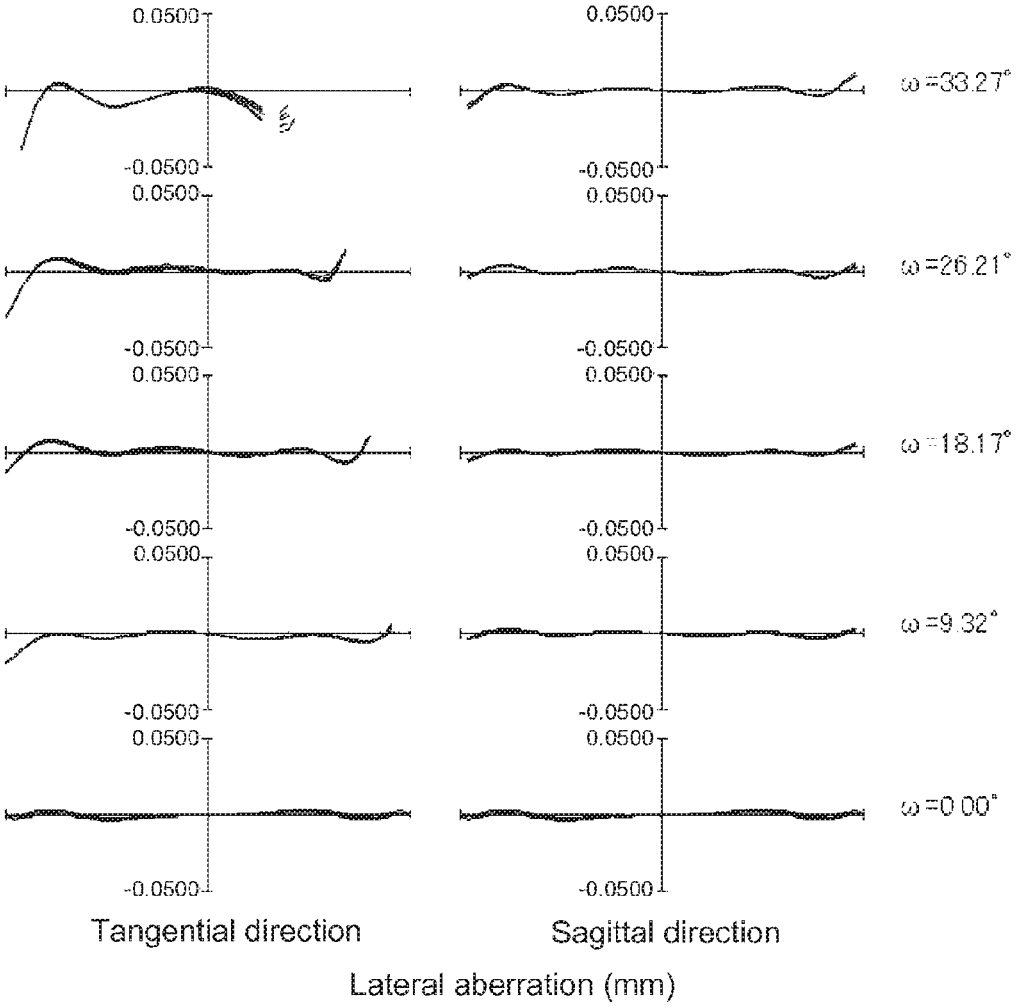
FIG. 5 is an aberration diagram showing a lateral aberration of the imaging lens in Numerical Data Example 2.
Figure 8:
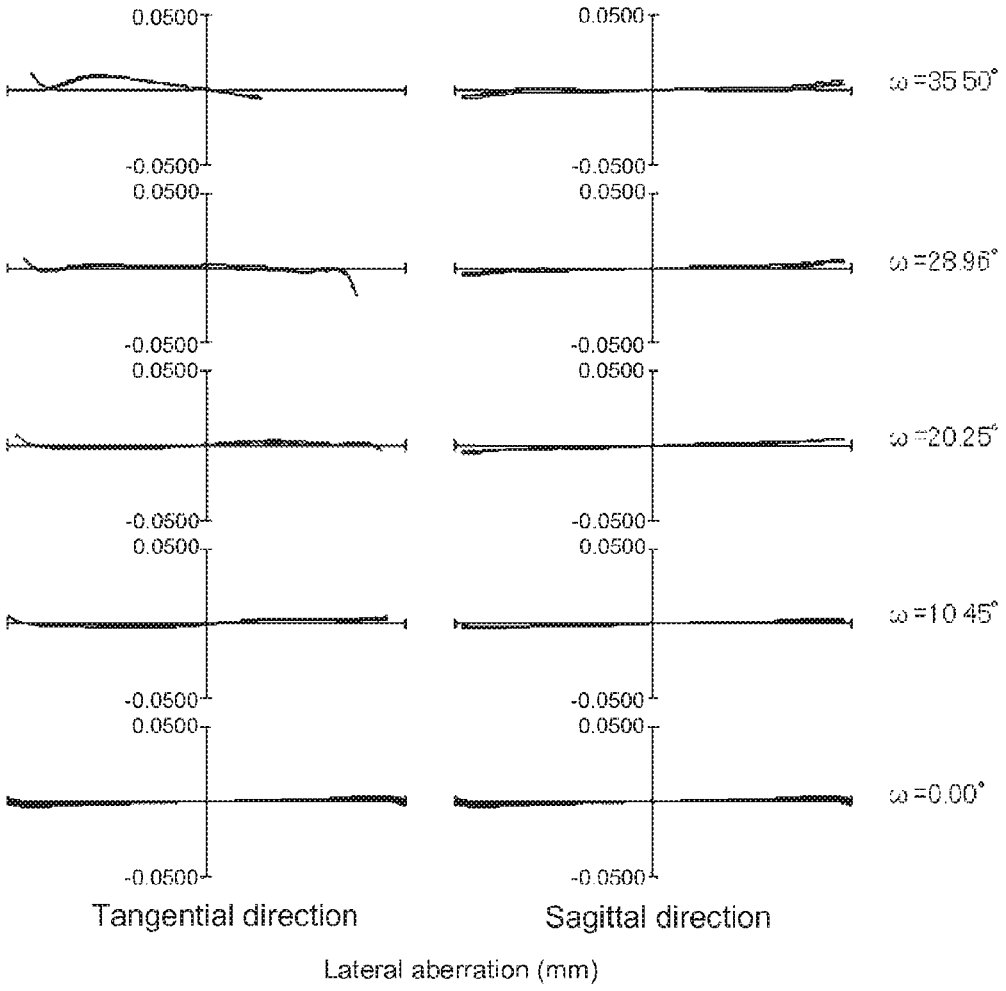
FIG. 8 is an aberration diagram showing a lateral aberration of the imaging lens in Numerical Data Example 3.
Figure 11:
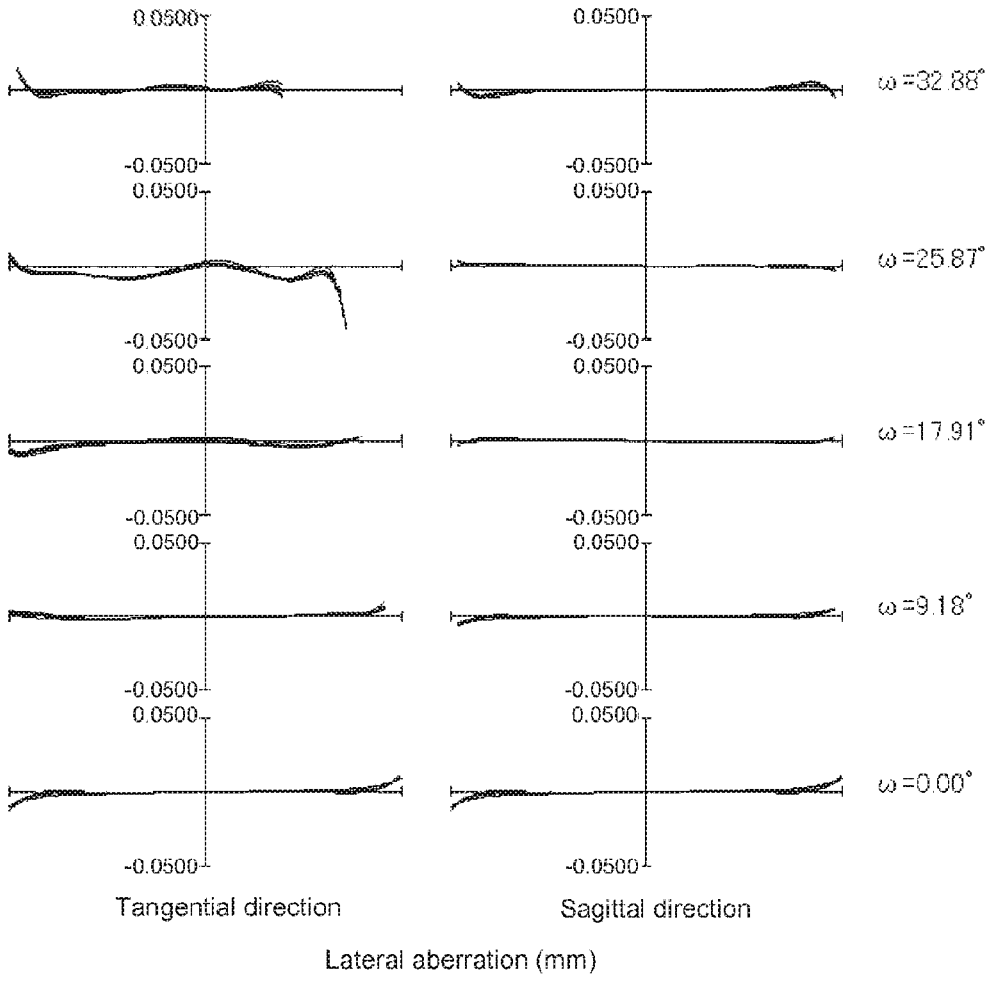
FIG. 11 is an aberration diagram showing a lateral aberration of the imaging lens in Numerical Data Example 4.

FIG. 2 shows the lateral aberration that corresponds to the half angle of view ω in the imaging lens of Numerical Data Example 1 by dividing into a tangential direction and sagittal direction (which is also the same in FIGS. 5, 8, and 11). Furthermore, FIG. 3 shows a spherical aberration (mm), an astigmatism (mm), and a distortion (%), respectively. In the spherical aberration diagram, the aberrations at the respective wavelengths of g line (435.84 nm), F line (486.13 nm), e line (546.07 nm), d line (587.56 nm), and C line (656.27 nm) are respectively indicated. Further, in the astigmatism diagram, the aberration on the sagittal image surface S and the aberration on the tangential image surface T are respectively indicated (which are the same in FIGS. 6, 9, and 12). As shown in FIGS. 2 and 3, in the imaging lens of Numerical Data Example 1, the respective aberrations are satisfactorily corrected.

Numerical Data Example 2

Basic lens data are shown below.
f = 5.888 mm, Fno = 3.000, ω = 33.27°
Unit: mm

Surface Data

| Surface Number i | R | d | Nd | νd |
|---|---|---|---|---|
| (Object) | ∞ | ∞ | | |
| 1 (Stop) | ∞ | 0.00000 | | |
| 2* | 1.9102 | 0.64885 | 1.53460 | 56.3 (=νd1) |
| 3* | 31.7016 | 0.15138 | | |
| 4* | 32.2938 | 0.30000 | 1.61420 | 26.0 (=νd2) |
| 5* | 3.1263 | 0.49796 | | |
| 6* | 5.0203 | 0.54150 | 1.53460 | 56.3 (=νd3) |
| 7* | 17.7320 | 0.71595 | | |
| 8* | −1.7385 | 0.79514 | 1.53460 | 56.3 (=νd4) |
| 9* | −1.1945 | 0.06004 | | |
| 10* | 23.4771 | 0.97150 | 1.53460 | 56.3 (=νd5) |
| 11* | 1.8913 | 0.90000 | | |
| 12 | ∞ | 0.21000 | 1.51633 | 64.12 |
| 13 | ∞ | 0.90271 | | |
| (image plane) | ∞ | | | |

-continued

Basic lens data are shown below.
f = 5.888 mm, Fno = 3.000, ω = 33.27°
Unit: mm f1 = 3.774
f2 = −5.658
f3 = 12.908
f4 = 4.731
f5 = −3.909
f12 = 7.941
f34 = 3.981
L15 = 4.68232

Aspheric Surface Data

Second Surface k = 0.00000000, $A_4$ = −0.60935179E−02, $A_6$ = −0.14836487E−02,
$A_8$ = 0.58172177E−01, $A_{10}$ = −0. 92636605E−01,
$A_{12}$ = 0.64338649E−01, $A_{14}$ = −0.18000000E−01
Third Surface k = 0.00000000, $A_4$ = −0.37213898E−01, $A_6$ = 0.59495237E−01,
$A_8$ = −0.10530910E−01, $A_{10}$ = −0.11123351E−01,
$A_{12}$ = −0.65206414E−02
Fourth Surface k = 0.00000000, $A_4$ = −0.93113075E−01, $A_6$ = 0.17824848,
$A_8$ = −0.15616907, $A_{10}$ = 0.72633906E−01,
$A_{12}$ = −0.27141522E−01
Fifth Surface k = 0.00000000, $A_4$ = −0.71937469E−01, $A_6$ = 0.16732493,
$A_8$ = −0.16595257, $A_{10}$ = 0.84793690E−01,
$A_{12}$ = −0.16793256E−01
Sixth Surface k = 0.13693290E+02, $A_4$ = −0.53326105E−01, $A_6$ = −0.11942210E−01,
$A_8$ = 0.12893456E−01, $A_{10}$ = −0.60447418E−02
Seventh Surface k = 0.17790910E+03, $A_4$ = −0.38719591E−01, $A_6$ = −0.20287221E−01,
$A_8$ = 0.27230067E−02, $A_{10}$ = −0.18941862E−02
Eighth Surface k = −0.01131517, $A_4$ = 0.14642524E−01, $A_6$ = −0.51671204E−01,
$A_8$ = 0.44911419E−01, $A_{10}$ = −0.22777822E−01,
$A_{12}$ = 0.24872721E−02
Ninth Surface k = −0.85604290, $A_4$ = 0.66111100E−01, $A_6$ = −0.27225762E−01,
$A_8$ = 0.19417970E−01, $A_{10}$ = −0.52722030E−02,
$A_{12}$ = 0.50122117E−03
Tenth Surface k = 0.82941990E+02, $A_4$ = −0.56542244E−01, $A_6$ = 0.30227928E−01,
$A_8$ = −0.84060662E−02, $A_{10}$ = 0.79169059E−03,
$A_{12}$ = 0.13962874E−03, $A_{14}$ = −0.42788235E−04,
$A_{16}$ = 0.30748826E−05
Eleventh Surface k = −8.75909800, $A_4$ = −0.46100654E−01, $A_6$ = 0.14779860E−01,
$A_8$ = −0.36296237E−02, $A_{10}$ = 0.59179333E−03,
$A_{12}$ = −0.62985700E−04, $A_{14}$ = 0.38534296E−05,
$A_{16}$ = −0.10603576E−06

The values of the conditional expressions (1) to (8) are shown below.

f34/f = 0.676
|f1/f2| = 0.667
f34/f12 = 0.501
νd1 = 56.3
νd2 = 26.0
νd3 = 56.3
νd4 = 56.3
νd5 = 56.3

Accordingly, the imaging lens of Numerical Data Example 2 satisfies the conditional expressions (1) to (8).

Figure 6:
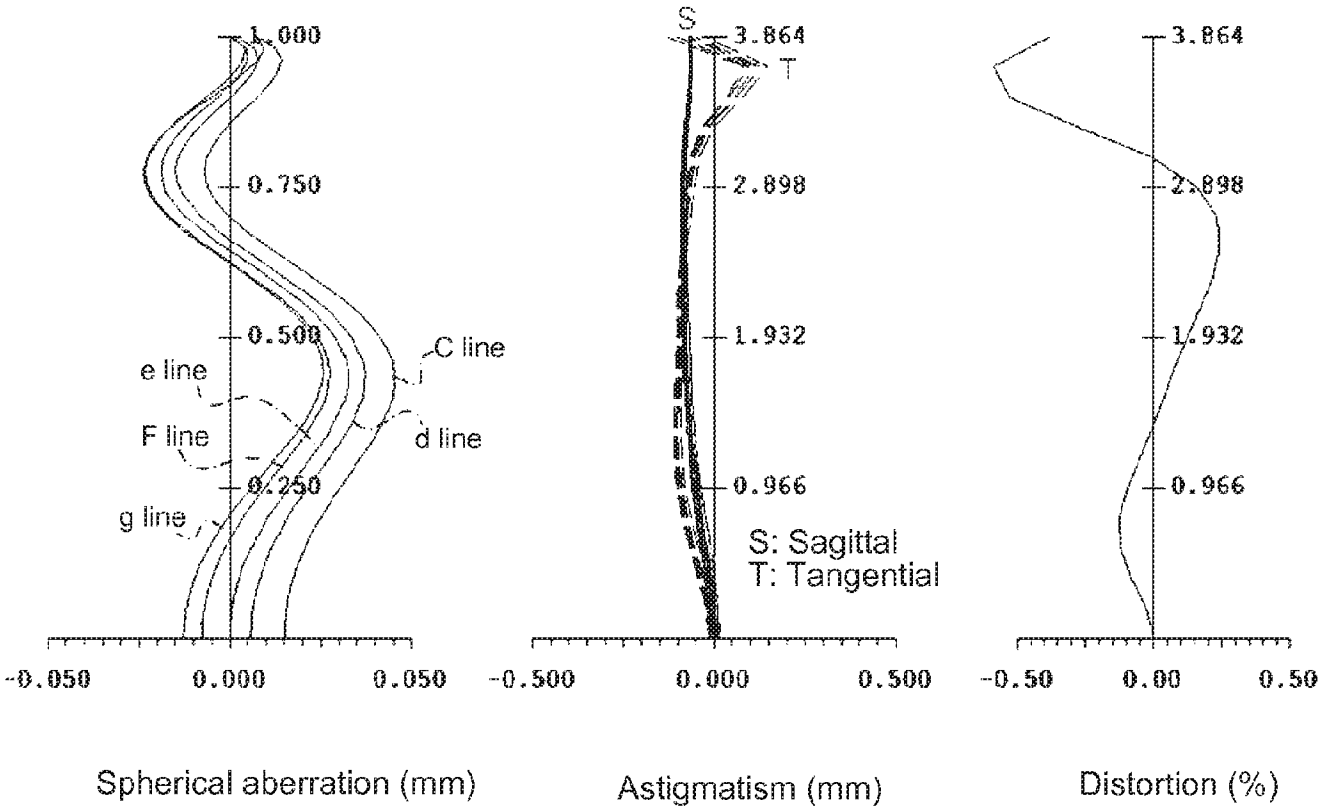
FIG. 6 is an aberration diagram showing a spherical aberration, an astigmatism, and a distortion of the imaging lens in Numerical Data Example 2.
Figure 7:
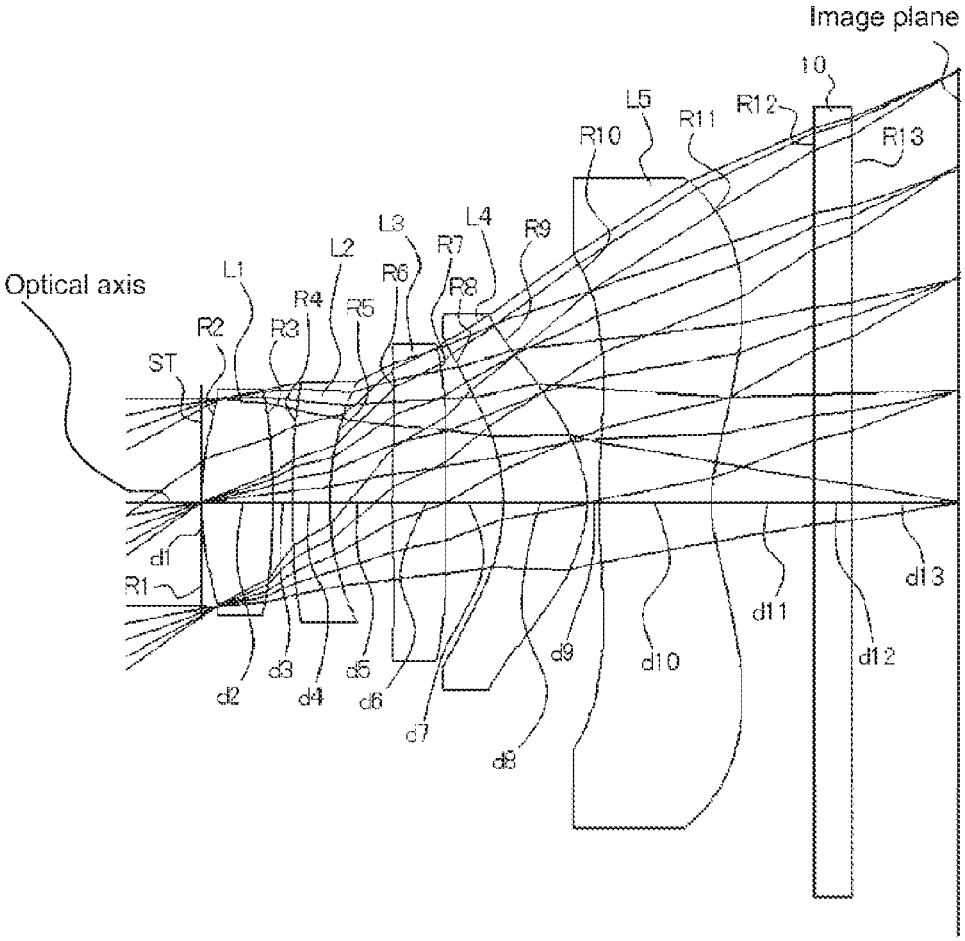
FIG. 7 is a schematic sectional view showing a configuration of an imaging lens in Numerical Data Example 3.

FIG. 5 shows the lateral aberration that corresponds to the half angle of view ω in the imaging lens of Numerical Data Example 2, and FIG-. 6 shows the spherical aberration (mm), the astigmatism (mm), and the distortion (%), respectively. As shown in FIGS. 5 and 6, in the imaging lens of Numerical Data Example 2, the image surface is satisfactorily corrected, and the respective aberrations are satisfactorily corrected similarly to Numerical Data Example 1.

Numerical Data Example 3

Basic lens data are shown below.
f = 4.766 mm, Fno = 2.900, ω = 35.50°
Unit: mm

Surface Data

| Surface Number i | R | d | Nd | νd |
|---|---|---|---|---|
| (Object) | ∞ | ∞ | | |
| 1 (Stop) | ∞ | 0.00000 | | |
| 2* | 2.3150 | 0.56000 | 1.53500 | 56.2 (=νd1) |
| 3* | −5.6670 | 0.15600 | | |
| 4* | 14.2000 | 0.29500 | 1.63400 | 23.9 (=νd2) |
| 5* | 2.3500 | 0.48500 | | |
| 6* | 7.5400 | 0.42800 | 1.54340 | 56.0 (=νd3) |
| 7* | 98.2570 | 0.44600 | | |
| 8* | −1.3860 | 0.65200 | 1.54340 | 56.0 (=νd4) |
| 9* | −1.0050 | 0.10000 | | |
| 10* | 5.1110 | 0.88200 | 1.53500 | 56.2 (=νd5) |
| 11* | 1.4780 | 0.80000 | | |
| 12 | ∞ | 0.30000 | 1.51633 | 64.12 |
| 13 | ∞ | 0.84091 | | |
| (image plane) | ∞ | | | |

f1 = 3.149
f2 = −4.485
f3 = 15.004
f4 = 4.198
f5 = −4.246
f12 = 7.148
f34 = 3.600
L15 = 4.00400

Aspheric Surface Data

Second Surface $k = 0.00000000$, $A_4 = -0.20609735E-01$, $A_6 = -0.86635750E-02$, $A_8 = -0.41092465E-01$, $A_{10} = 0.14610217E-01$ Third Surface $k = 0.00000000$, $A_4 = 0.29740191E-01$, $A_6 = -0.58777750E-01$, $A_8 = -0.22460108E-01$, $A_{10} = 0.25927431E-01$ Fourth Surface $k = 0.00000000$, $A_4 = 0.57597969E-01$, $A_6 = -0.32080574E-01$, $A_8 = -0.83064180E-02$, $A_{10} = 0.26550300E-01$ Fifth Surface $k = 0.00000000$, $A_4 = 0.37999286E-02$, $A_6 = 0.20353948E-01$, $A_8 = -0.98598681E-02$, $A_{10} = 0.10758619E-01$ Sixth Surface $k = 0.00000000$, $A_4 = -0.63793469E-01$, $A_6 = 0.55178545E-02$, $A_8 = -0.64178800E-02$, $A_{10} = 0.81174025E-02$ Seventh Surface $k = 0.00000000$, $A_4 = -0.31834097E-01$, $A_6 = -0.48702563E-02$, $A_8 = -0.25983774E-02$, $A_{10} = 0.20212526E-02$ -continued Basic lens data are shown below.
f = 4.766 mm, Fno = 2.900, ω = 35.50°
Unit: mm Eighth Surface $k = -0.46194440$, $A_4 = 0.69350049E-01$, $A_6 = -0.51916822E-02$, $A_8 = 0.18682594E-01$, $A_{10} = -0.89429170E-02$, $A_{12} = 0.13942614E-02$ Ninth Surface $k = -1.01311200$, $A_4 = 0.81085778E-01$, $A_6 = -0.41721302E-01$, $A_8 = 0.23744754E-01$, $A_{10} = -0.38004290E-02$, $A_{12} = 0.74937061E-04$ Tenth Surface $k = -0.82922410E+02$, $A_4 = -0.26011142E-01$, $A_6 = -0.77102124E-02$, $A_8 = 0.61622809E-02$, $A_{10} = -0.15640982E-02$, $A_{12} = 0.13063488E-04$, $A_{14} = 0.55529881E-04$, $A_{16} = -0.62996500E-05$ Eleventh Surface $k = -8.24681400$, $A_4 = -0.45770587E-01$, $A_6 = 0.12151448E-01$, $A_8 = -0.31734309E-02$, $A_{10} = 0.61093272E-03$, $A_{12} = -0.87817174E-04$, $A_{14} = 0.78389771E-05$, $A_{16} = -0.31638966E-06$ The values of the conditional expressions (1) to (8) are shown below.

f34/f = 0.755
|f1/f2| = 0.702
f34/f12 = 0.504
νd1 = 56.2
νd2 = 23.9
νd3 = 56.0
νd4 = 56.0
νd5 = 56.2

Accordingly, the imaging lens of Numerical Data Example 3 satisfies the conditional expressions (1) to (8).

Figure 9:
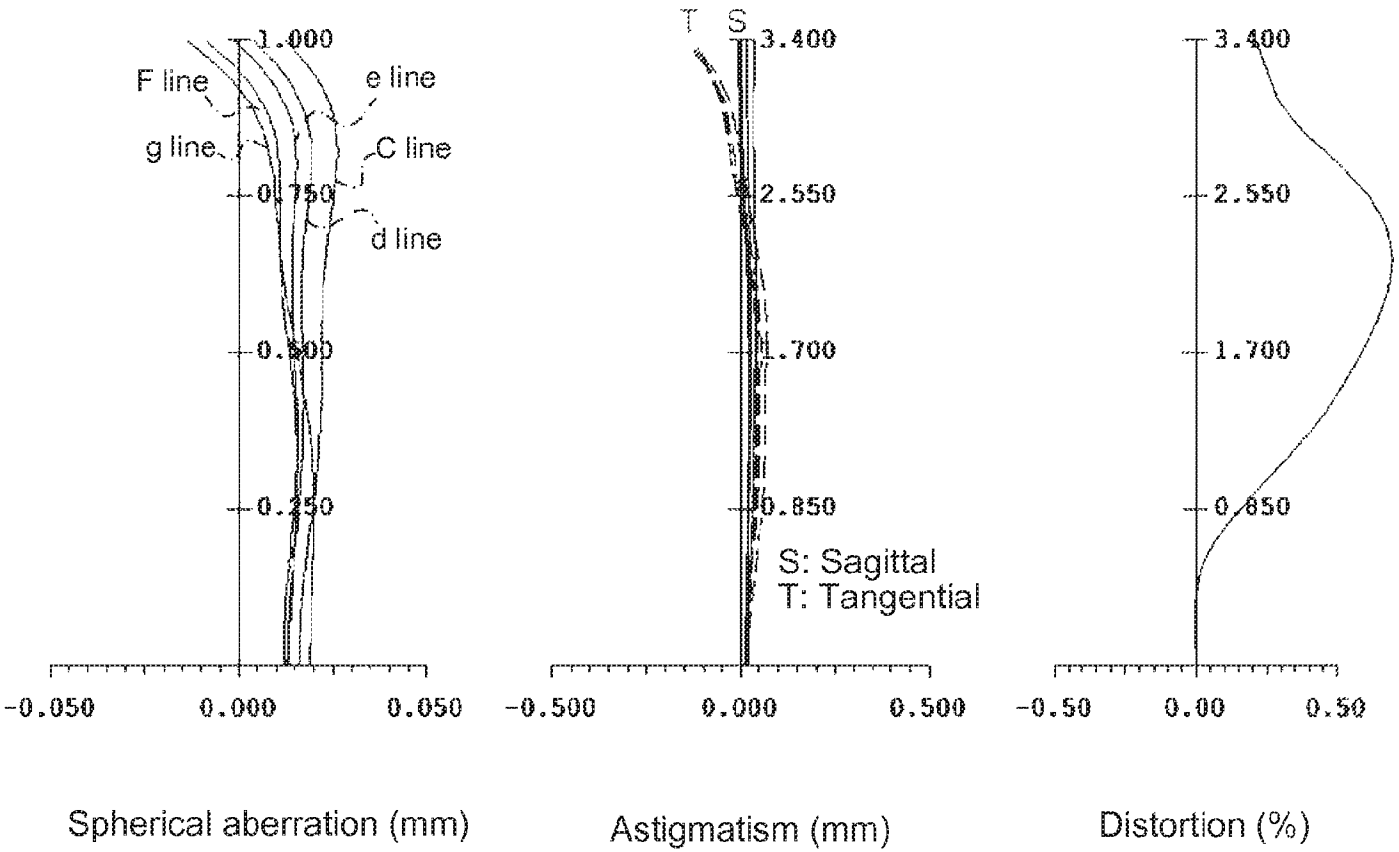
FIG. 9 is an aberration diagram showing a spherical aberration, an astigmatism, and a distortion of the imaging lens in Numerical Data Example 3.
Figure 10:
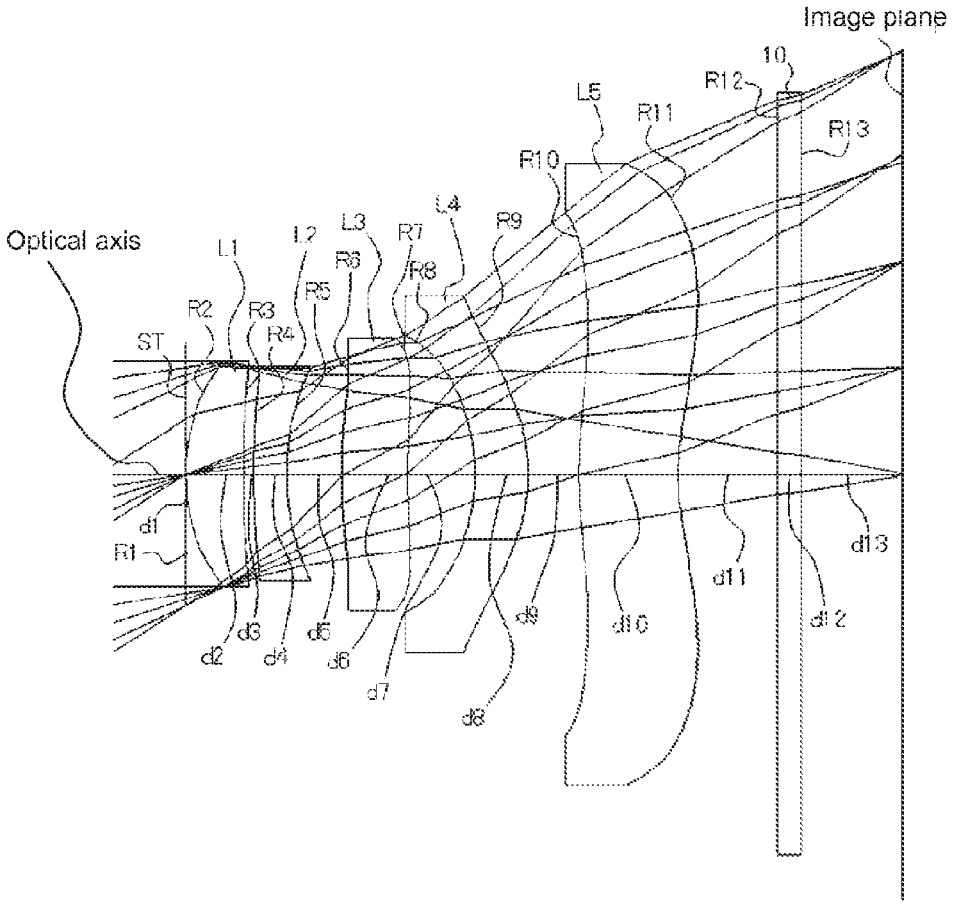
FIG. 10 is a schematic sectional view showing a configuration of an imaging lens in Numerical Data Example 4.

FIG. 8 shows the lateral aberration that corresponds to the half angle of view ω in the imaging lens of Numerical Data Example 3, and FIG. 9 shows the spherical aberration (mm), the astigmatism (mm), and the distortion (%), respectively. As shown in FIGS. 8 and 9, in the imaging lens of Numerical Data Example 3, the image surface is satisfactorily corrected, and the respective aberrations are satisfactorily corrected similarly to Numerical Data Example 1.

Numerical Data Example 4

Basic lens data are shown below.
f = 5.977 mm, Fno = 3.000, ω = 32.88°
Unit: mm

Surface Data

| Surface Number i | R | d | Nd | νd |
|---|---|---|---|---|
| (Object) | ∞ | ∞ | | |
| 1 (Stop) | ∞ | 0.00000 | | |
| 2* | 1.7580 | 0.53427 | 1.53460 | 56.3 (=νd1) |
| 3* | 59.9873 | 0.08287 | | |
| 4* | 9.8172 | 0.30000 | 1.61420 | 26.0 (=νd2) |
| 5 | 2.2598 | 0.49985 | | |
| 6* | 4.6361 | 0.60038 | 1.53460 | 56.3 (=νd3) |
| 7* | 8.0048 | 0.61367 | | |
| 8* | −1.6178 | 0.47743 | 1.53460 | 56.3 (=νd4) |
| 9* | −1.5926 | 0.46474 | | |
| 10* | 4.0915 | 0.89810 | 1.53460 | 56.3 (=νd5) |
| 11* | 2.4733 | 0.90000 | | |

-continued

Basic lens data are shown below.
f = 5.977 mm, Fno = 3.000, ω = 32.88°
Unit: mm

| | | | | |
|---|---|---|---|---|
| 12 | ∞ | 0.21000 | 1.51633 | 64.12 |
| 13 | ∞ | 0.92015 | | |
| (image plane) | ∞ | | | |

f1 = 3.377
f2 = −4.853
f3 = 19.402
f4 = 25.166
f5 = −14.502
f12 = 7.582
f34 = 12.071
L15 = 4.47131

Aspheric Surface Data

Second Surface k = 0.00000000, $A_4$ = −0.33152569E−02, $A_6$ = 0.13173300E−01, $A_8$ = 0.77191632E−03

Third Surface k = 0.00000000, $A_4$ = 0.32319580E−01, $A_6$ = 0.28036656E−01, $A_8$ = −0.32979603E−01

Fourth Surface k = 0.00000000, $A_4$ = 0.28140071E−01, $A_6$ = 0.95468218E−02, $A_8$ = −0.34624463E−01

Sixth Surface k = 0.00000000, $A_4$ = −0.37529209E−01, $A_6$ = −0.15021746E−01, $A_8$ = 0.10801104E−01, $A_{10}$ = −0.86227102E−02

Seventh Surface k = 0.00000000, $A_4$ = −0.31957513E−01, $A_6$ = −0.17064039E−01, $A_8$ = −0.21703745E−02, $A_{10}$ = −0.60001032E−02

Eighth Surface k = 0.00000000, $A_4$ = 0.82909571E−01, $A_6$ = −0.84515903E−01, $A_8$ = 0.67645260E−01, $A_{10}$ = −0.33427795E−01

Ninth Surface k = −0.74063050, $A_4$ = 0.49847310E−01, $A_6$ = −0.22906063E−01, $A_8$ = 0.18211377E−01, $A_{10}$ = −0.51316845E−02, $A_{12}$ = 0.46696366E−03

Tenth Surface k = 0.00000000, $A_4$ = −0.81469036E−01, $A_6$ = 0.31668591E−01, $A_8$ = −0.82919297E−02, $A_{10}$ = 0.83175228E−03, $A_{12}$ = 0.13683655E−03, $A_{14}$ = −0.42038213E−04, $A_{16}$ = 0.28326573E−05

Eleventh Surface k = −0.10882180E+02, $A_4$ = −0.37826192E−01, $A_6$ = 0.12120123E−01, $A_8$ = −0.34424448E−02, $A_{10}$ = 0.60541930E−03, $A_{12}$ = −0.63639649E−04, $A_{14}$ = 0.38587184E−05, $A_{16}$ = −0.12352911E−06

The values of the conditional expressions (1) to (8) are shown below.

f34/f = 2.020
|f1/f2| = 0.696
f34/f12 = 1.592
νd1 = 56.3
νd2 = 26.0
νd3 = 56.3
νd4 = 56.3
νd5 = 56.3

Accordingly, the imaging lens of Numerical Data Example 4 satisfies the conditional expressions (1) to (8).

Figure 12:
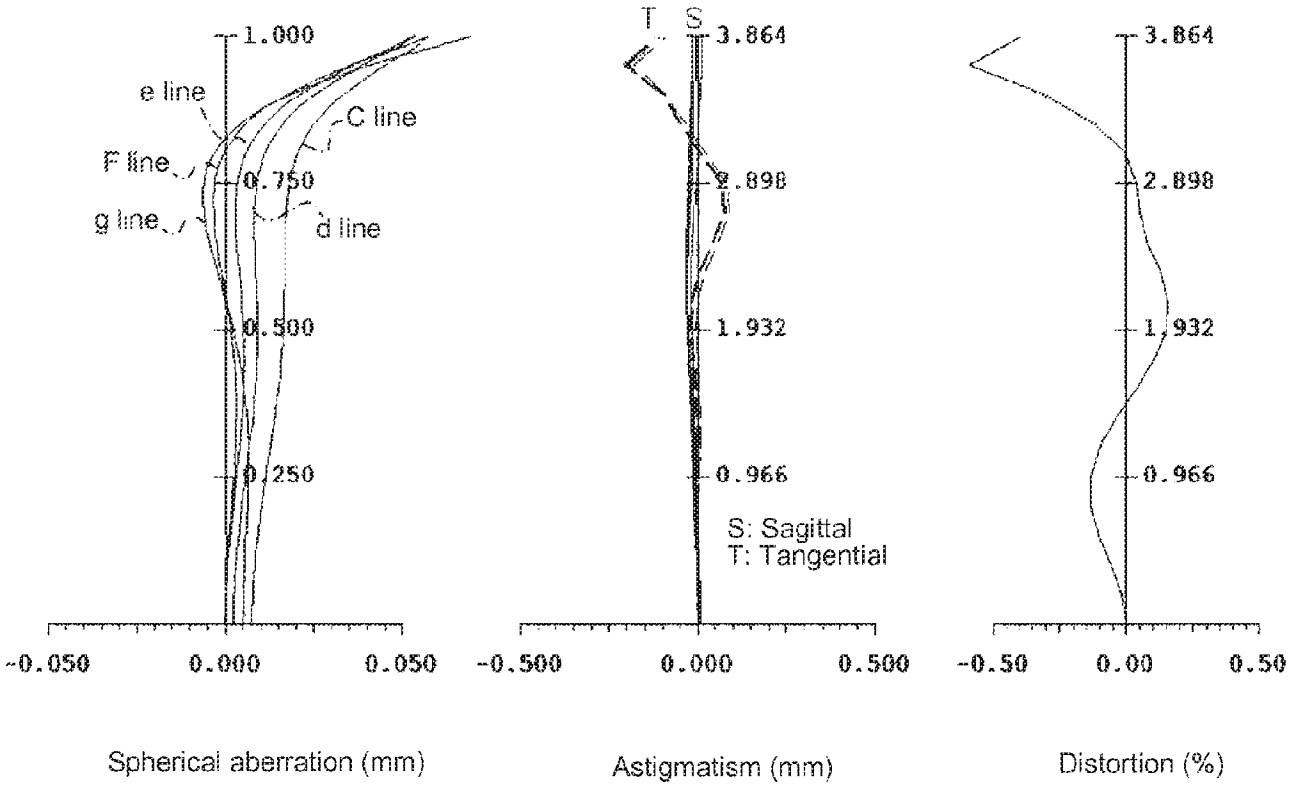
FIG. 12 is an aberration diagram showing a spherical aberration, an astigmatism, and a distortion of the imaging lens in Numerical Data Example 4.

FIG. 11 shows the lateral aberration that corresponds to the half angle of view ω in the imaging lens of Numerical Data Example 4, and FIG. 12 shows the spherical aberration (mm), the astigmatism (mm), and the distortion (%), respectively. As shown in FIGS. 11 and 12, in the imaging lens of Numerical Data Example 4, and the image surface is satisfactorily corrected, the respective aberrations are satisfactorily corrected similarly to Numerical Data Example 1.

Accordingly, when the imaging lens of the embodiment is applied to an imaging optical system of a cellular phone, a digital still camera, a portable information terminal, a security camera, an onboard camera, a network camera, and the like, it is possible to obtain the high performance and the small size for the camera or the like.

The invention may be applicable to the imaging lens of a device that is required to have a small size and satisfactory aberration correction ability, e.g., the imaging lenses used in the cellular phones, the digital still cameras, and the like.

What is claimed is:

[1. An imaging lens comprising:

a first lens having positive refractive power;

a second lens having negative refractive power;

a third lens having positive refractive power;

a fourth lens having positive refractive power; and a fifth lens having negative refractive power in this order from an object side to an image side, wherein said second lens is formed in a shape so that both a curvature radius of a surface thereof on the object side and a curvature radius of a surface thereof on the image side are positive, said fourth lens is formed in a shape so that both a curvature radius of a surface thereof on the object side and a curvature radius of a surface thereof on the image side are negative, said first lens and said second lens have a composite focal length f12, and said third lens and said fourth lens have a composite focal length f34 so that the following conditional expression is satisfied:

$$1.592 \leq f34/f12 < 40, \text{ and}$$

said first lens has an Abbe's number νd1, said second lens has an Abbe's number νd2, said third lens has an Abbe's number νd3, said fourth lens has an Abbe's number νd4, and said fifth lens has an Abbe's number νd5 so that the following conditional expressions are satisfied:

$$50 < \nu d1 < 85$$

$$\nu d2 < 30$$

$$50 < \nu d3 < 85$$

$$50 < \nu d4 < 85$$

$$50 < \nu d5 < 85.]$$

[2. The imaging lens according to claim 1, wherein said fifth lens is formed in a shape so that both a curvature radius of a surface thereof on the object side and a curvature radius of a surface thereof on the image side are positive.]

[3. The imaging lens according to claim 1, wherein said third lens and said fourth lens have a composite focal length f34 and a whole lens system has a focal length f so that the following conditional expression is satisfied:

$$0.5 < f34/f < 5.0.]$$

[4. The imaging lens according to claim 1, wherein said first lens has a focal length f1 and said second lens has a focal length f2 so that the following conditional expression is satisfied:

$$0.4 < |f1/f2| < 1.0.]$$

*5. An imaging lens comprising:*

*a first lens having positive refractive power;*

*a second lens;*

*a third lens;*

*a fourth lens; and*

*a fifth lens, arranged in this order from an object side to an image plane side,*

*wherein said fourth lens is formed in a shape so that a curvature radius of a surface thereof on the image plane side is negative,*

*said first lens and said second lens have a composite focal length f12, and said third lens and said fourth lens have a composite focal length f34 so that the following conditional expression is satisfied:*

$$1.592 \leq f34/f12 < 4.0, \text{ and}$$

*said first lens has an Abbe's number νd1, said second lens has an Abbe's number νd2, said third lens has an Abbe's number νd3, said fourth lens has an Abbe's number νd4, and said fifth lens has an Abbe's number νd5 so that the following conditional expressions are satisfied:*

$$50 < \nu d1 < 85,$$

$$\nu d2 < 30,$$

$$50 < \nu d3 < 85,$$

$$50 < \nu d4 < 85,$$

$$50 < \nu d5 < 85.$$

*6. The imaging lens according to claim 5, wherein said third lens has positive refractive power.*

*7. The imaging lens according to claim 5, wherein said fourth lens has positive refractive power.*

*8. The imaging lens according to claim 5, wherein said fifth lens has negative refractive power.*

*9. The imaging lens according to claim 5, wherein said second lens is formed in a shape so that a curvature radius of a surface thereof on the object side is positive, and*

*said fourth lens is formed in the shape so that a curvature radius of a surface thereof on the object side is negative.*

*10. The imaging lens according to claim 5, wherein said first lens has a focal length f1 and said second lens has a focal length f2 so that the following conditional expression is satisfied:*

$$0.4 < |f1/f2| < 1.0.$$

*11. An imaging lens comprising:*

*a first lens having positive refractive power;*

*a second lens;*

*a third lens;*

*a fourth lens; and*

*a fifth lens, arranged in this order from an object side to an image plane side,*

*wherein said third lens is formed in a shape so that a curvature radius of a surface thereof on the object side is positive,*

*said first lens and said second lens have a composite focal length f12, and said third lens and said fourth lens have a composite focal length f34 so that the following conditional expression is satisfied:*

$$1.592 \leq f34/f12 < 4.0, \text{ and}$$

*said first lens has an Abbe's number νd1, said second lens has an Abbe's number νd2, said third lens has an Abbe's number νd3, said fourth lens has an Abbe's number νd4, and said fifth lens has an Abbe's number νd5 so that the following conditional expressions are satisfied:*

$$50 < \nu d1 < 85,$$

$$\nu d2 < 30,$$

$$50 < \nu d3 < 85,$$

$$50 < \nu d4 < 85,$$

$$50 < \nu d5 < 85.$$

*12. The imaging lens according to claim 11, wherein said third lens has positive refractive power.*

*13. The imaging lens according to claim 11, wherein said fourth lens has positive refractive power.*

*14. The imaging lens according to claim 11, wherein said fifth lens has negative refractive power.*

*15. The imaging lens according to claim 11, wherein said second lens is formed in a shape so that a curvature radius of a surface thereof on the object side is positive, and*

*said fourth lens is formed in the shape so that a curvature radius of a surface thereof on the object side is negative.*

*16. The imaging lens according to claim 11, wherein said third lens and said fourth lens have a composite focal length f34 so that the following conditional expression is satisfied:*

$$0.5 < f34/f < 5.0,$$

*where f is a focal length of a whole lens system.*

* * * * *